(12) United States Patent
Hart

(10) Patent No.: US 9,203,881 B2
(45) Date of Patent: Dec. 1, 2015

(54) SYSTEMS AND METHODS OF ONLINE SOCIAL ENVIRONMENT BASED TRANSLATION OF ENTITY METHODS

(71) Applicant: salesforce.com inc., San Francisco, CA (US)

(72) Inventor: Bryan Conrad Hart, Halifax (CA)

(73) Assignee: salesforce.com, inc., San Francisco, CA (US)

( * ) Notice: Subject to any disclaimer, the term of this patent is extended or adjusted under 35 U.S.C. 154(b) by 278 days.

(21) Appl. No.: 13/960,702

(22) Filed: Aug. 6, 2013

(65) Prior Publication Data
US 2014/0289327 A1 Sep. 25, 2014

Related U.S. Application Data

(60) Provisional application No. 61/804,900, filed on Mar. 25, 2013.

(51) Int. Cl.
G06F 15/16 (2006.01)
G06F 15/173 (2006.01)
H04L 29/06 (2006.01)

(52) U.S. Cl.
CPC .................................. H04L 65/403 (2013.01)

(58) Field of Classification Search
CPC ...... G06Q 10/107; G06Q 50/01; H04L 51/32; H04L 51/04; G06F 17/3089
See application file for complete search history.

(56) References Cited

U.S. PATENT DOCUMENTS

| | | | |
|---|---|---|---|
| 5,577,188 A | 11/1996 | Zhu | |
| 5,608,872 A | 3/1997 | Schwartz et al. | |
| 5,649,104 A | 7/1997 | Carleton et al. | |
| 5,715,450 A | 2/1998 | Ambrose et al. | |
| 5,761,419 A | 6/1998 | Schwartz et al. | |
| 5,819,038 A | 10/1998 | Carleton et al. | |
| 5,821,937 A | 10/1998 | Tonelli et al. | |
| 5,831,610 A | 11/1998 | Tonelli et al. | |
| 5,873,096 A | 2/1999 | Lim et al. | |
| 5,918,159 A | 6/1999 | Fomukong et al. | |
| 5,963,953 A | 10/1999 | Cram et al. | |
| 6,092,083 A | 7/2000 | Brodersen et al. | |
| 6,161,149 A | 12/2000 | Achacoso et al. | |
| 6,169,534 B1 | 1/2001 | Raffel et al. | |
| 6,178,425 B1 | 1/2001 | Brodersen et al. | |
| 6,189,011 B1 | 2/2001 | Lim et al. | |
| 6,216,135 B1 | 4/2001 | Brodersen et al. | |
| 6,233,617 B1 | 5/2001 | Rothwein et al. | |
| 6,266,669 B1 | 7/2001 | Brodersen et al. | |
| 6,295,530 B1 | 9/2001 | Ritchie et al. | |
| 6,324,568 B1 | 11/2001 | Diec | |
| 6,324,693 B1 | 11/2001 | Brodersen et al. | |

(Continued)

*Primary Examiner* — Peling Shaw
(74) *Attorney, Agent, or Firm* — Haynes Beffel & Wolfeld LLP; Ernest J. Beffel, Jr.

(57) ABSTRACT

The technology disclosed relates to adapting online social feed items according to the posting formats of each of the multiple destination online social environments to which they are posted, regardless of the source online social environments from which they originate. In particular, it relates to creating separate instances of a feed item such that each of the instances includes tag formats, social handles or identifiers that are compatible to the online social environments in which they are embedded. These separate instances of a feed item can all be embedded in a first online social environment while preserving their tag formats corresponding to other online social environments.

20 Claims, 10 Drawing Sheets

Translation Environment

(56) References Cited

U.S. PATENT DOCUMENTS

| | | |
|---|---|---|
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,069,231 B1 | 6/2006 | Cinarkaya et al. |
| 7,069,497 B1 | 6/2006 | Desai |
| 7,124,164 B1 * | 10/2006 | Chemtob ................ 709/204 |
| 7,181,758 B1 | 2/2007 | Chan |
| 7,289,976 B2 | 10/2007 | Kihneman et al. |
| 7,340,411 B2 | 3/2008 | Cook |
| 7,356,482 B2 | 4/2008 | Frankland et al. |
| 7,401,094 B1 | 7/2008 | Kesler |
| 7,412,455 B2 | 8/2008 | Dillon |
| 7,508,789 B2 | 3/2009 | Chan |
| 7,603,483 B2 | 10/2009 | Psounis et al. |
| 7,620,655 B2 | 11/2009 | Larsson et al. |
| 7,698,160 B2 | 4/2010 | Beaven et al. |
| 7,779,475 B2 | 8/2010 | Jakobson et al. |
| 7,851,004 B2 | 12/2010 | Hirao et al. |
| 7,853,881 B1 * | 12/2010 | Aly Assal et al. .............. 715/734 |
| 8,014,943 B2 | 9/2011 | Jakobson |
| 8,015,495 B2 | 9/2011 | Achacoso et al. |
| 8,032,297 B2 | 10/2011 | Jakobson |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,594 B2 | 1/2012 | Beaven et al. |
| 8,209,308 B2 | 6/2012 | Rueben et al. |
| 8,209,333 B2 | 6/2012 | Hubbard et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 8,756,275 B2 | 6/2014 | Jakobson |
| 8,769,004 B2 | 7/2014 | Jakobson |
| 8,769,017 B2 | 7/2014 | Jakobson |
| 2001/0044791 A1 | 11/2001 | Richter et al. |
| 2002/0072951 A1 | 6/2002 | Lee et al. |
| 2002/0082892 A1 * | 6/2002 | Raffel et al. .................... 705/8 |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0066031 A1 | 4/2003 | Laane |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2006/0021019 A1 | 1/2006 | Hinton et al. |
| 2007/0180040 A1 * | 8/2007 | Etgen et al. .................... 709/207 |
| 2008/0010377 A1 * | 1/2008 | Nissennboim ................ 709/226 |
| 2008/0208984 A1 * | 8/2008 | Rosenberg et al. ........... 709/206 |
| 2008/0249972 A1 | 10/2008 | Dillon |
| 2009/0063415 A1 | 3/2009 | Chatfield et al. |
| 2009/0077636 A1 * | 3/2009 | Duffie, III ........................ 726/5 |
| 2009/0080635 A1 * | 3/2009 | Altberg et al. ........... 379/216.01 |
| 2009/0100342 A1 | 4/2009 | Jakobson |
| 2009/0177744 A1 | 7/2009 | Marlow et al. |
| 2009/0198487 A1 * | 8/2009 | Wong et al. ...................... 704/4 |
| 2009/0235335 A1 * | 9/2009 | Mendiola ........................ 726/4 |
| 2010/0030578 A1 * | 2/2010 | Siddique et al. .................. 705/3 |
| 2011/0135071 A1 * | 6/2011 | Milstein ...................... 379/88.14 |
| 2011/0218958 A1 | 9/2011 | Warshavsky et al. |
| 2011/0247051 A1 | 10/2011 | Bulumulla et al. |
| 2012/0042218 A1 | 2/2012 | Cinarkaya et al. |
| 2012/0109631 A1 * | 5/2012 | Gopal et al. ...................... 704/3 |
| 2012/0179449 A1 * | 7/2012 | Raskino et al. ................... 704/2 |
| 2012/0233137 A1 | 9/2012 | Jakobson et al. |
| 2012/0233209 A1 * | 9/2012 | Cheng et al. .................. 707/770 |
| 2012/0254904 A1 * | 10/2012 | Brown et al. .................. 719/328 |
| 2012/0290407 A1 | 11/2012 | Hubbard et al. |
| 2013/0073280 A1 * | 3/2013 | O'Neil et al. ...................... 704/9 |
| 2013/0073473 A1 * | 3/2013 | Heath ............................ 705/319 |

(56) References Cited

U.S. PATENT DOCUMENTS

2013/0086245 A1* 4/2013 Lu et al. .................. 709/223
2013/0091204 A1* 4/2013 Loh et al. ................. 709/204
2013/0157699 A1* 6/2013 Talwar et al. ............. 455/466
2013/0212497 A1   8/2013 Zelenko et al.
2013/0247216 A1   9/2013 Cinarkaya et al.

* cited by examiner

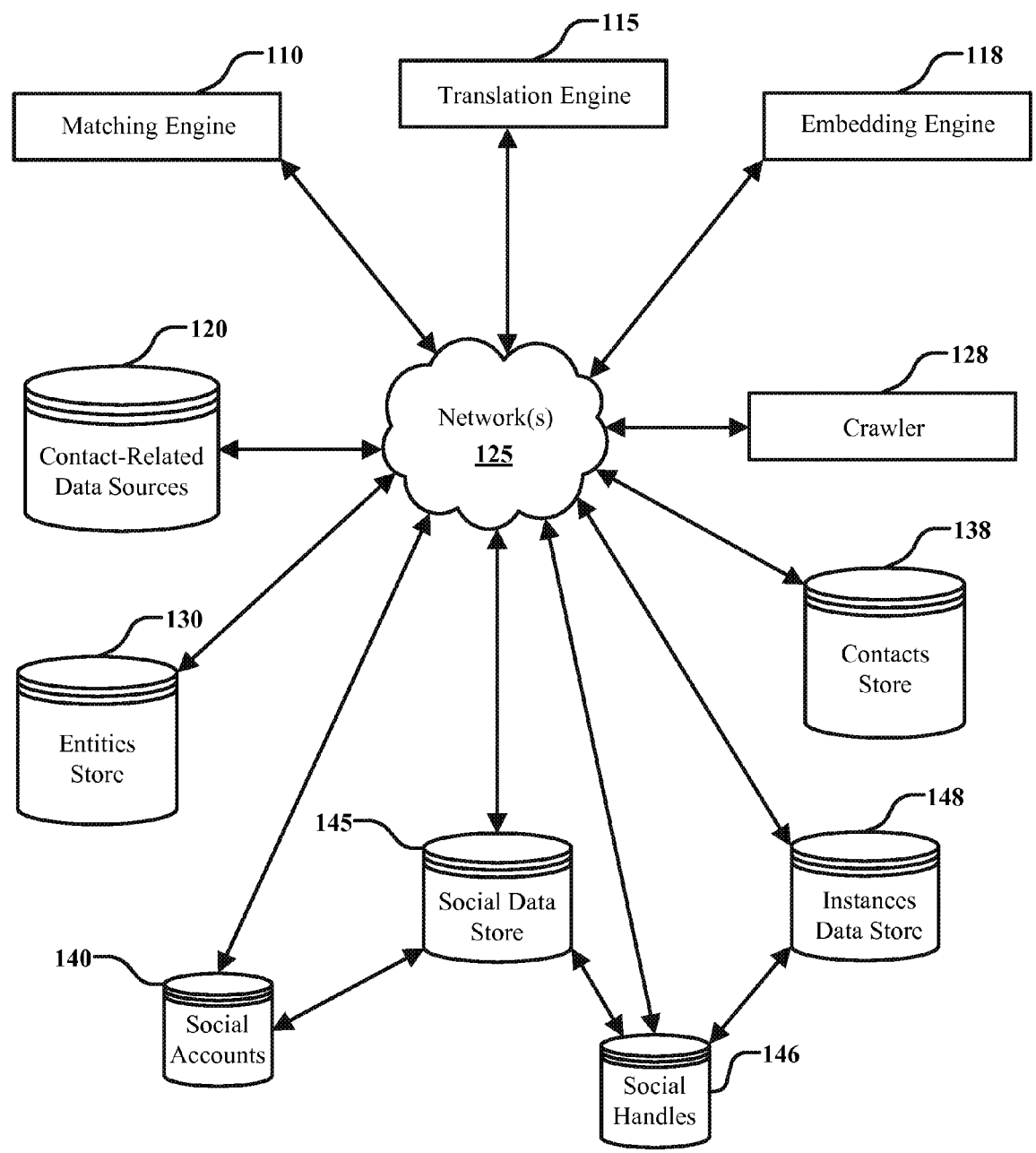
FIG. 1 – Translation Environment

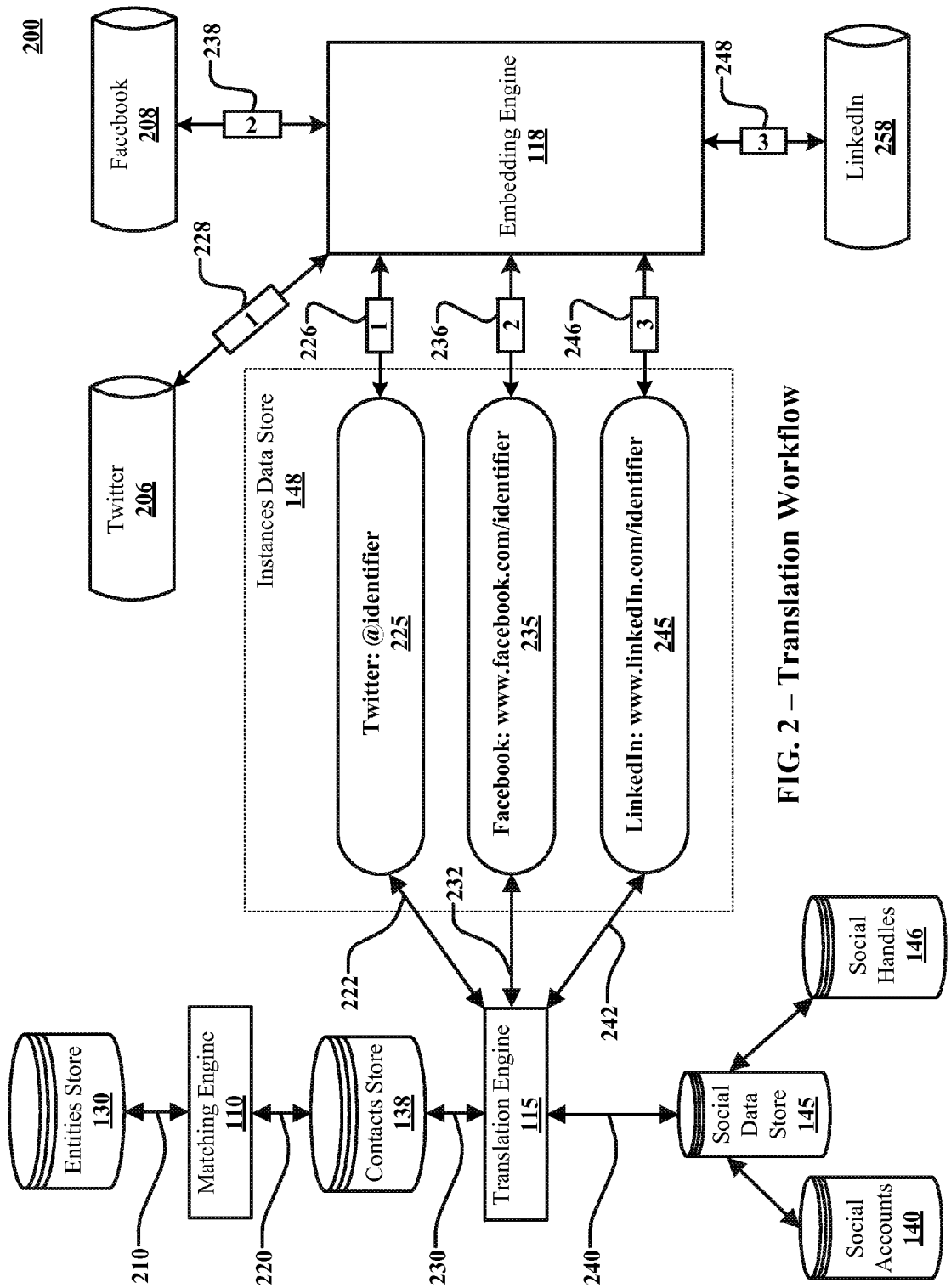
FIG. 2 – Translation Workflow

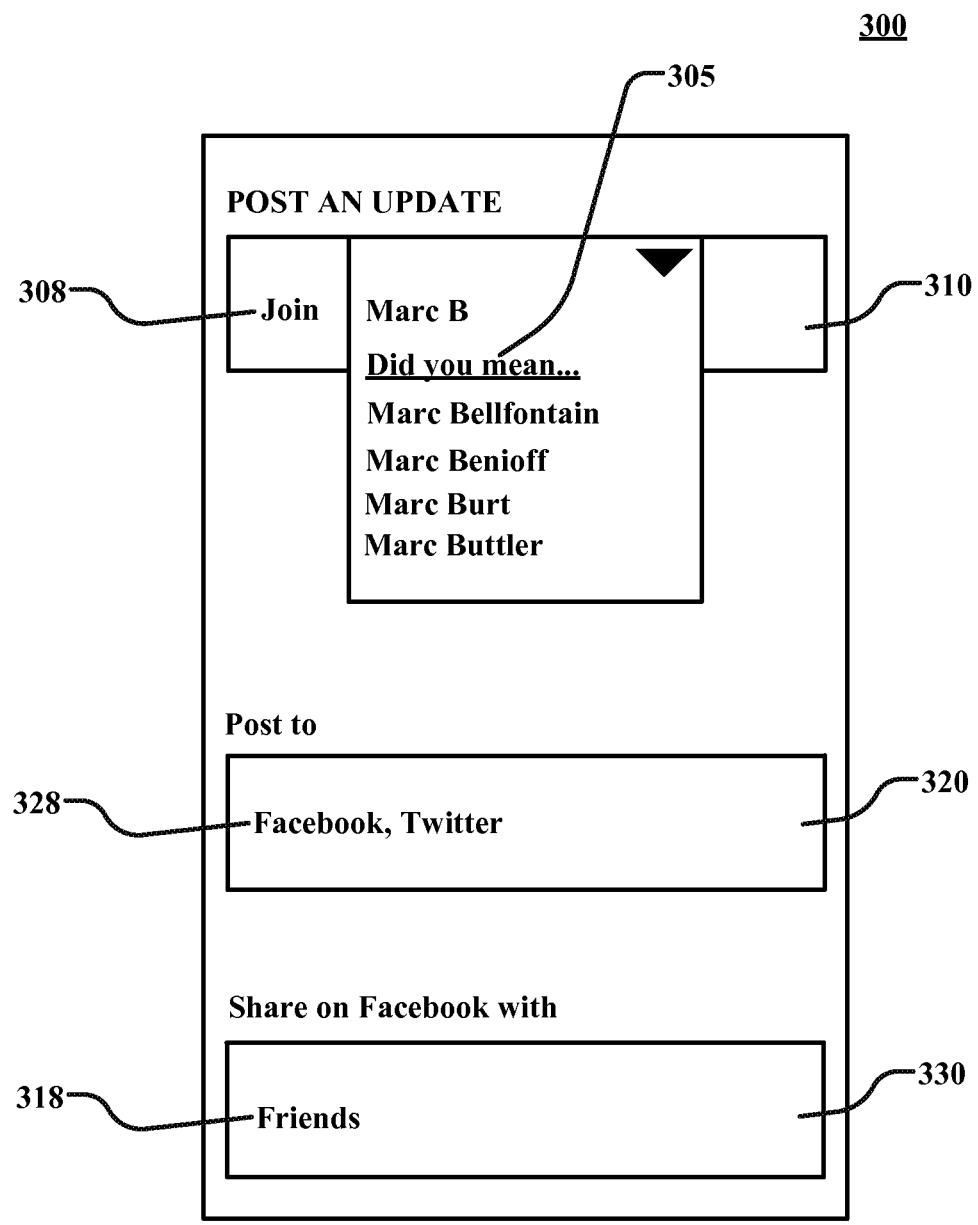
FIG. 3 – User Selection

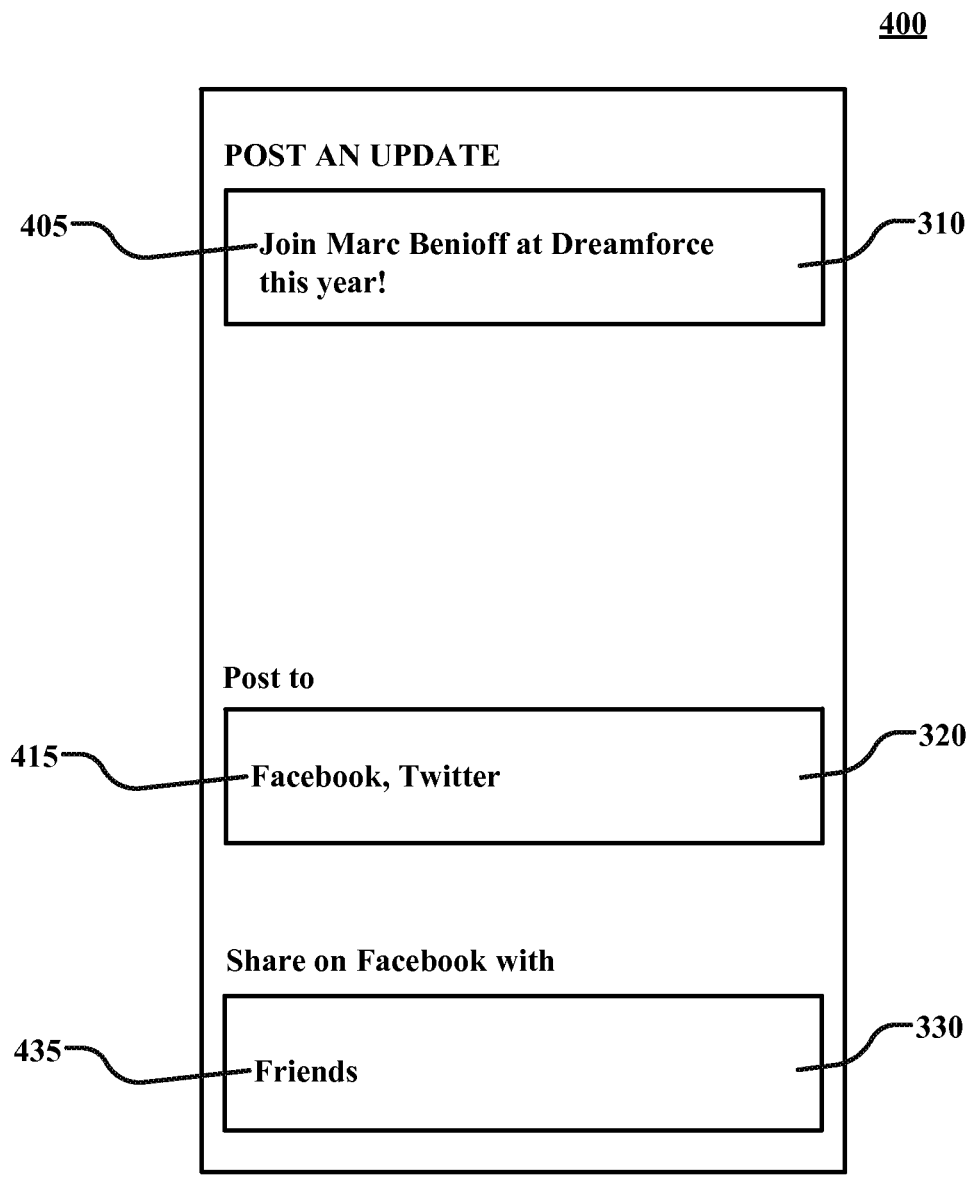
FIG. 4 – Feed Item Creation

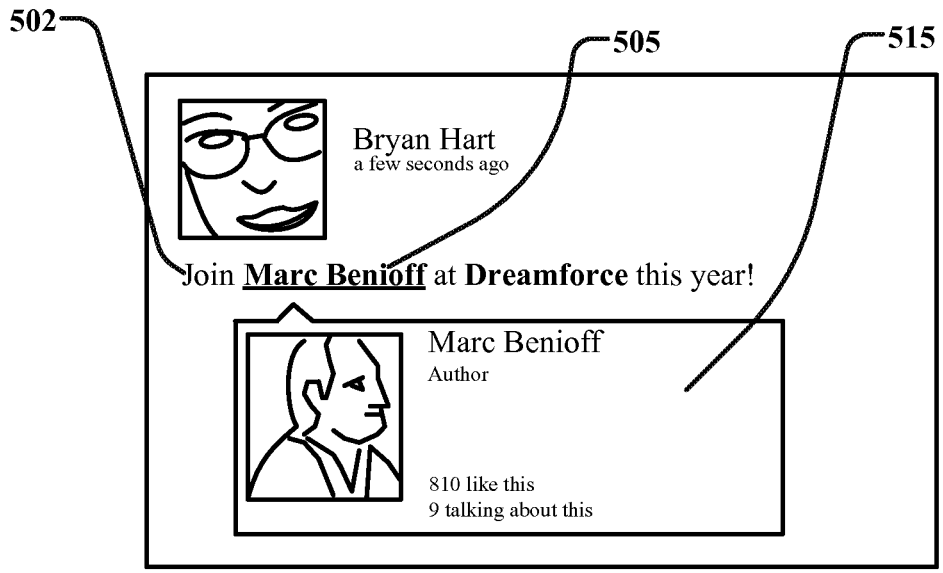
FIG. 5A – Facebook Embedding
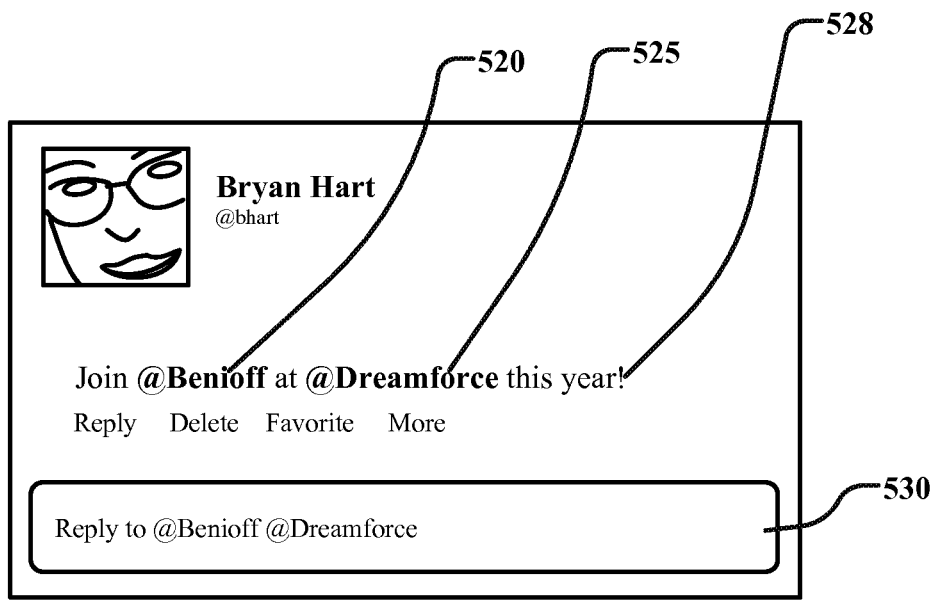
FIG. 5B – Twitter Embedding

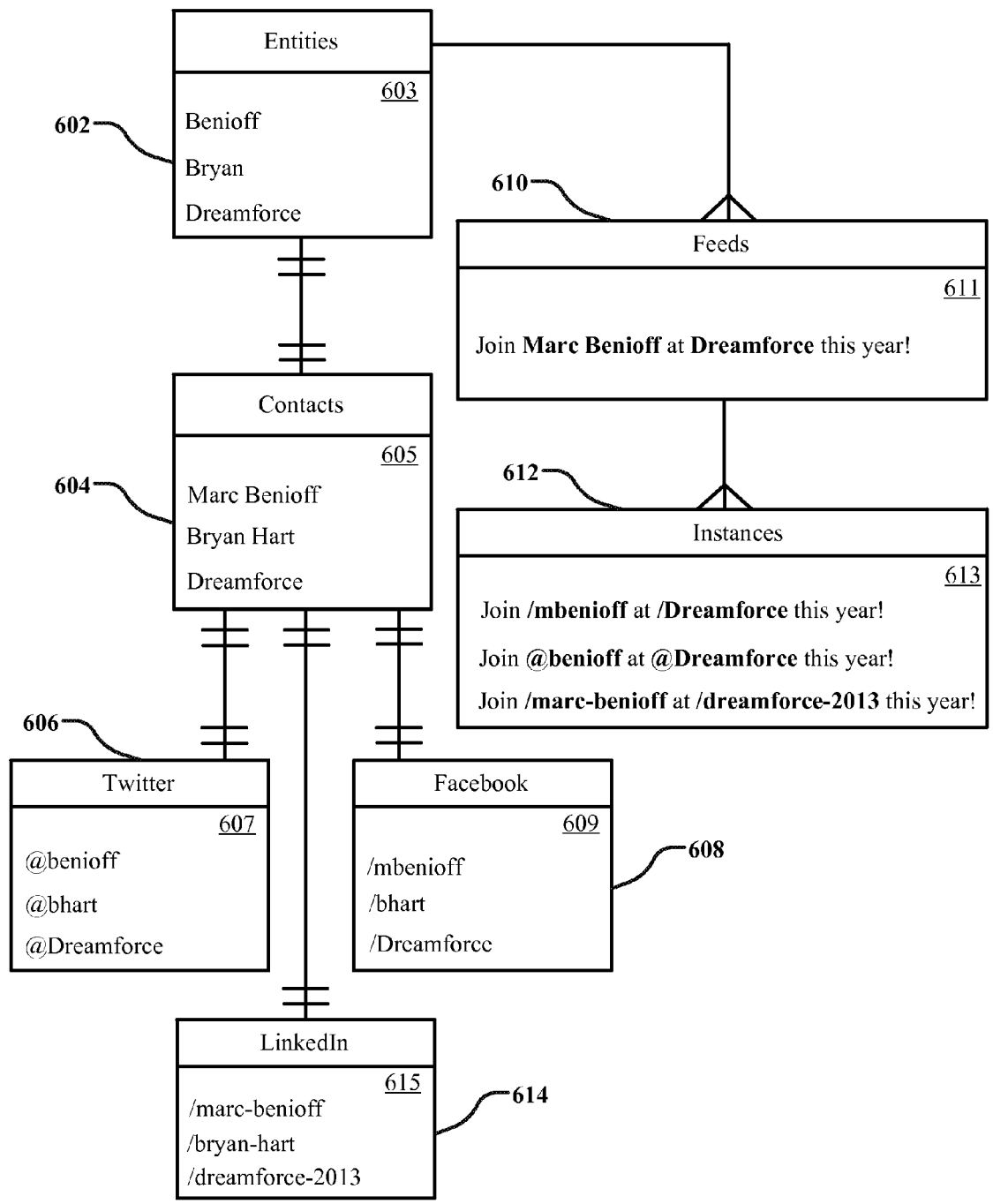
FIG. 6 – Translation Schema

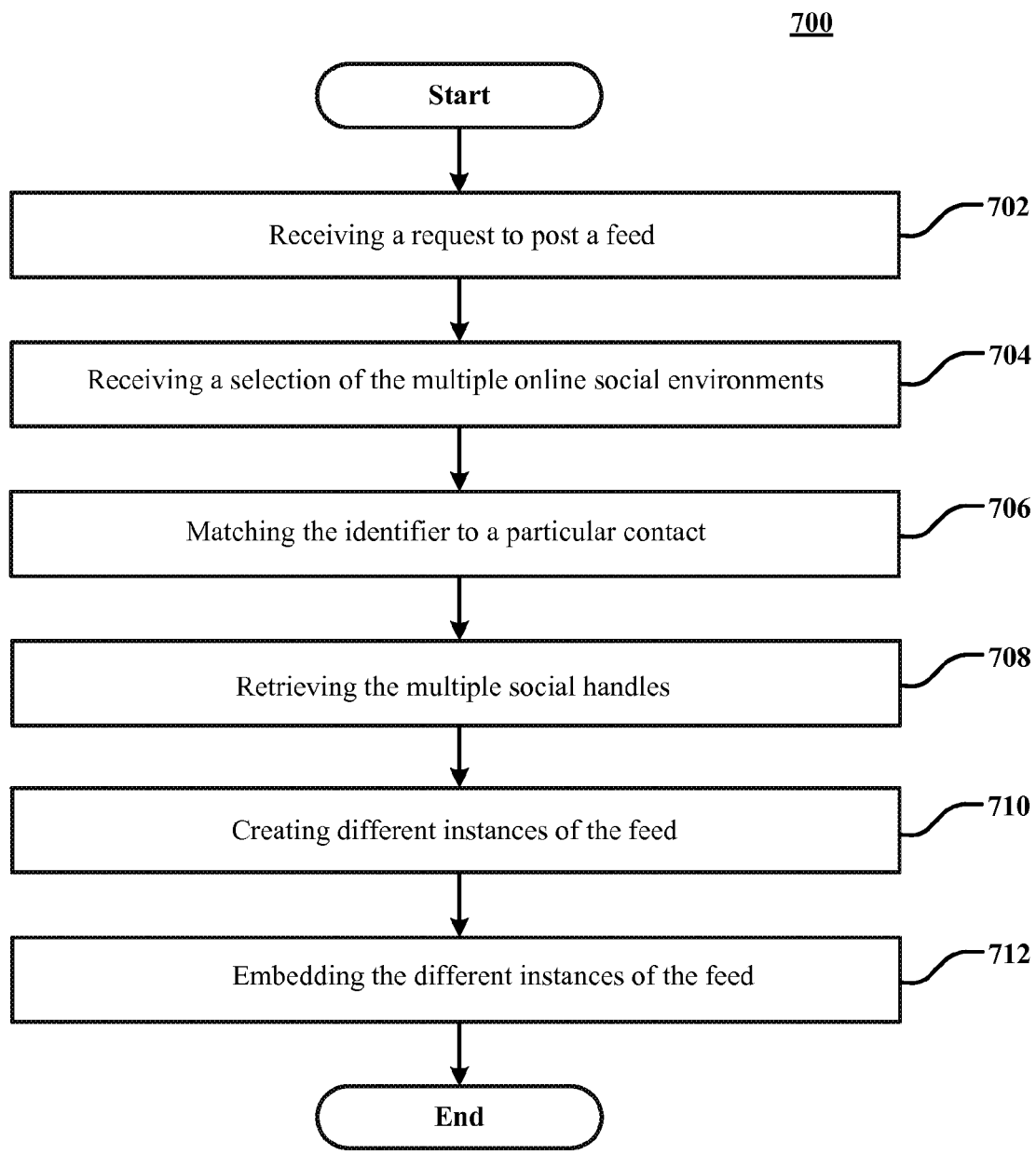
FIG. 7 – Flow Chart of Entity Mentions Adaptation

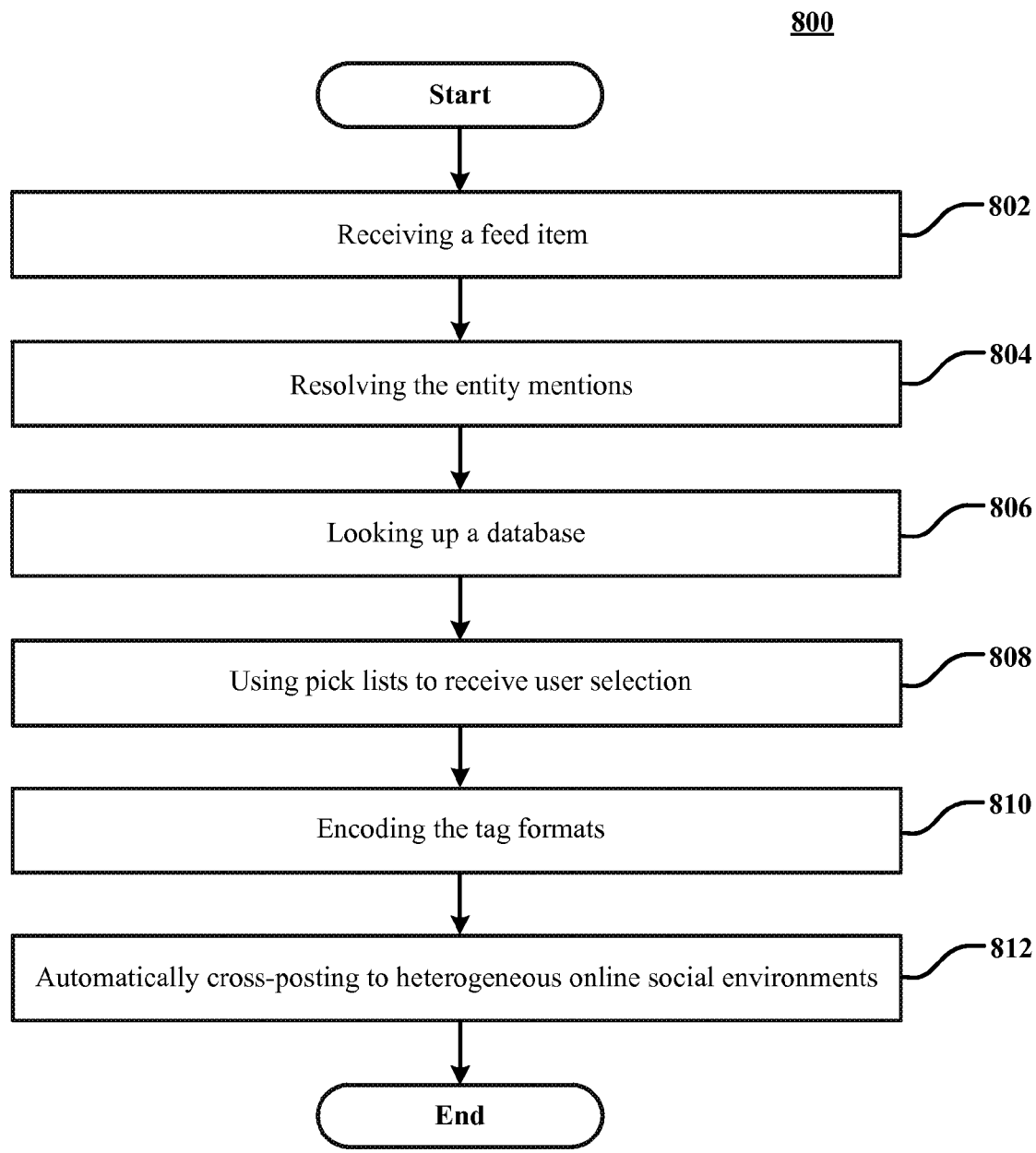
FIG. 8 – Flow Chart of Entity Mentions Conversion

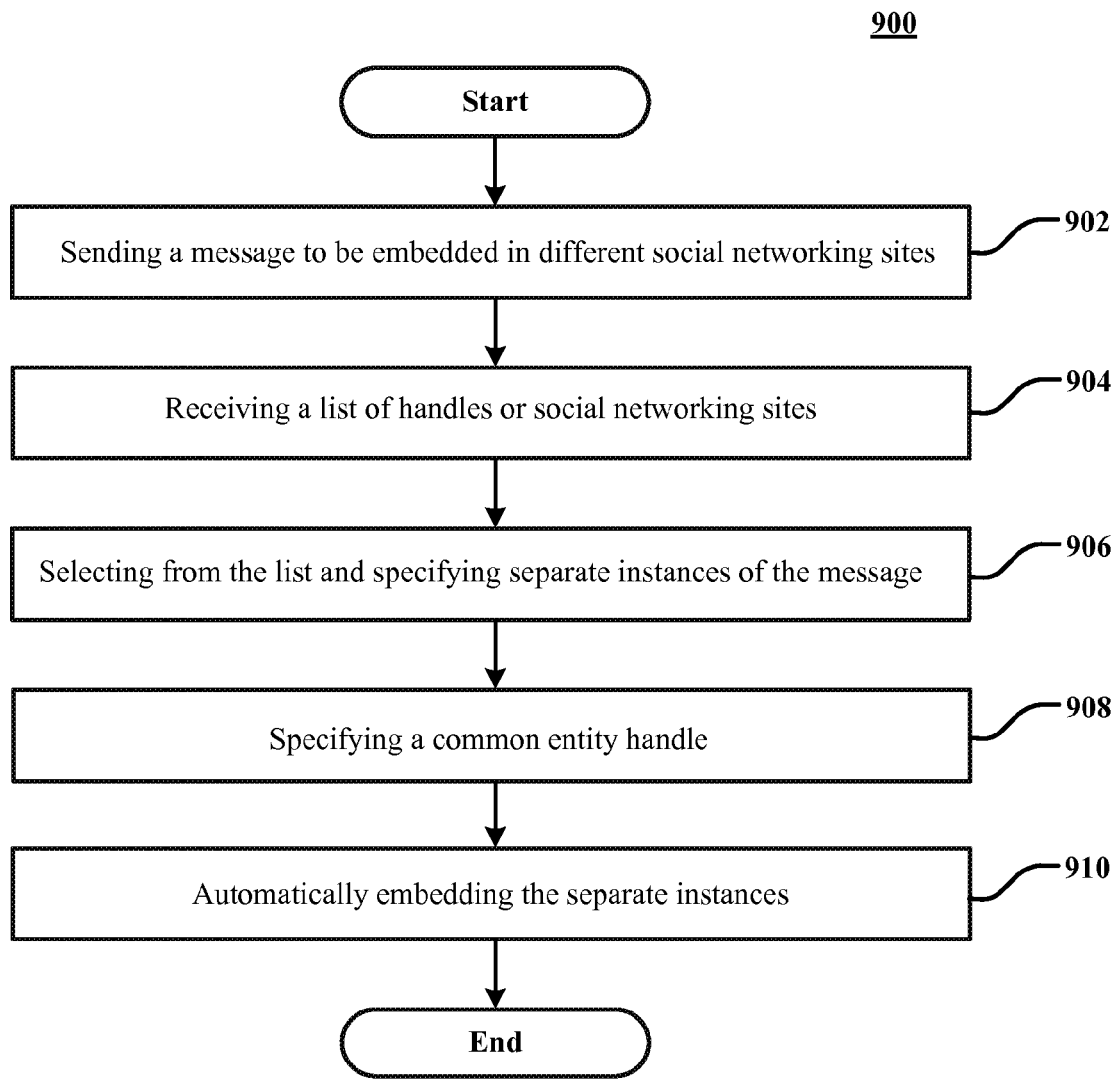
FIG. 9 – Flow Chart of Entity Mentions Translation

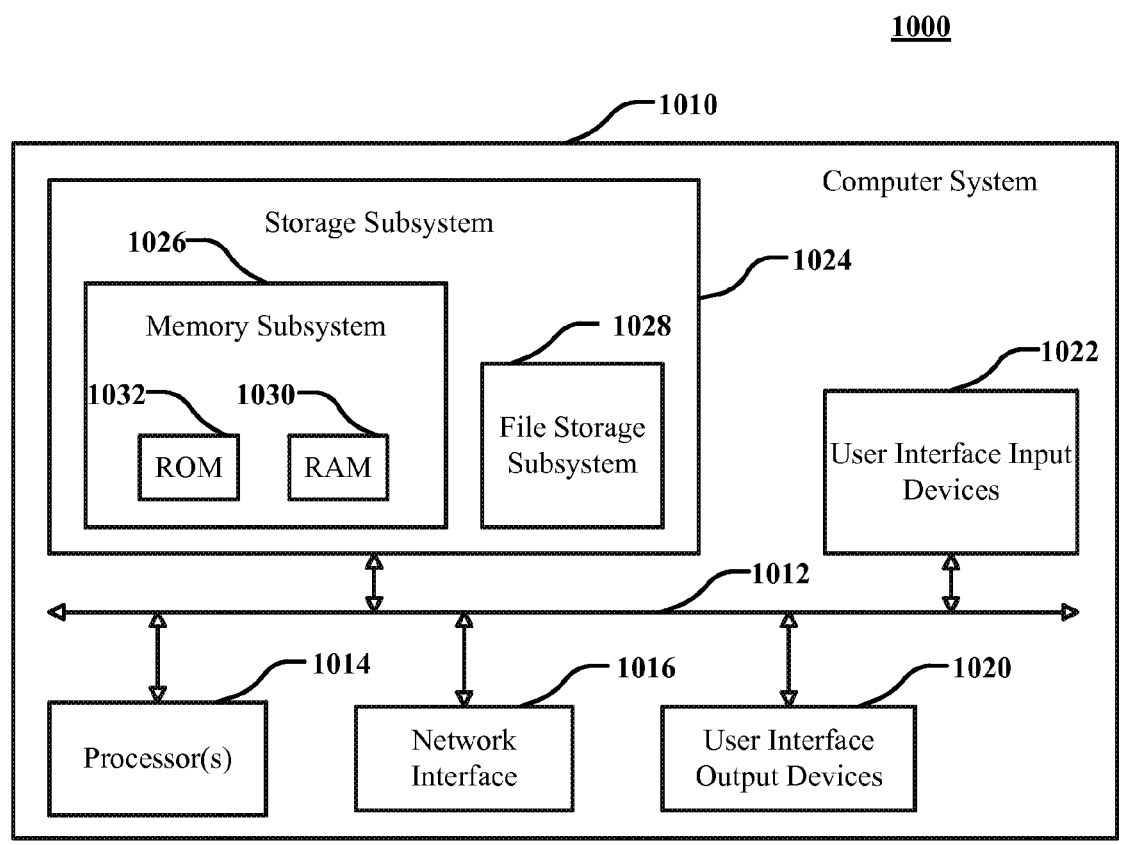
FIG. 10 – Computer System

SYSTEMS AND METHODS OF ONLINE SOCIAL ENVIRONMENT BASED TRANSLATION OF ENTITY METHODS

RELATED APPLICATION

This application claims the benefit of U.S. Provisional Patent Application No. 61/804,900, entitled, "System and Method for Preserving Different User Name Mentions Referencing the Same Entity for Posting in Multiple Social Networks," filed on 25 Mar. 2013. The provisional application is hereby incorporated by reference for all purposes.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to implementations of the claimed inventions.

The technology disclosed relates to adapting online social feed items according to the posting formats of each of the multiple destination online social environments to which they are posted, regardless of the source online social environments from which they originate. In particular, it relates to creating separate instances of a feed item such that each of the instances includes tag formats, social handles or identifiers that are compatible to the online social environments in which they are embedded. These separate instances of a feed item can all be embedded in a first online social environment while preserving their tag formats corresponding to other online social environments.

With ever increasing numbers of online social communities, more and more users are now registered at more than one online social community. Unfortunately, current platforms offered by the online social communities do not support intra-community communication, which is specific to each of the online social community.

Accordingly, it is desirable to provide systems and methods that offer a flexible approach to intra-community communication. An opportunity arises to create social feed items that are specific to each of the destination online social communities to which they are posted, regardless of the source online social communities from which they originate. Improved user experience and engagement and higher customer satisfaction and retention may result.

SUMMARY

The technology disclosed relates to adapting online social feed items according to the posting formats of each of the multiple destination online social environments to which they are posted, regardless of the source online social environments from which they originate. In particular, it relates to creating separate instances of a feed item such that each of the instances includes tag formats, social handles or identifiers that are compatible to the online social environments in which they are embedded. These separate instances of a feed item can all be embedded in a first online social environment while preserving their tag formats corresponding to other online social environments.

Other aspects and advantages of the present invention can be seen on review of the drawings, the detailed description and the claims, which follow.

BRIEF DESCRIPTION OF THE DRAWINGS

The included drawings are for illustrative purposes and serve only to provide examples of possible structures and process operations for one or more implementations of this disclosure. These drawings in no way limit any changes in form and detail that may be made by one skilled in the art without departing from the spirit and scope of this disclosure. A more complete understanding of the subject matter may be derived by referring to the detailed description and claims when considered in conjunction with the following figures, wherein like reference numbers refer to similar elements throughout the figures.

FIG. 1 illustrates one implementation of an entity mention translation environment.

FIG. 2 shows one implementation of workflow of entity mention translation.

FIG. 3 illustrates one implementation of a graphical user-interface of selecting contents for inclusion in a feed item.

FIG. 4 is one implementation of a graphical user-interface of feed item creation.

FIGS. 5A and 5B show various implementations of graphical user-interfaces of embedding a feed item in multiple online social environments.

FIG. 6 illustrates one implementation of an entity mention translation schema.

FIG. 7 is a flow chart of one implementation of adapting entity mentions to online social environments based specificities.

FIG. 8 shows a flow chart of one implementation of converting entity mentions to online social environments specific identifiers.

FIG. 9 illustrates a flow chart of one implementation of translating entity mentions to social networking sites specific identifiers.

FIG. 10 is a block diagram of an example computer system of entity mention translation.

DETAILED DESCRIPTION

The following detailed description is made with reference to the figures. Sample implementations are described to illustrate the technology disclosed, not to limit its scope, which is defined by the claims. Those of ordinary skill in the art will recognize a variety of equivalent variations on the description that follows.

The technology disclosed can include systems and methods for adapting entity mentions in a feed item to multiple online social environments based environment-specific requirements such as social handle-types, tag formats and identifiers. When a user creates a feed item to post on more than one social networking sites, the technology disclosed can adapt that feed item to be compatible with posting formats of multiple social networking sites. In this application, the terms "social networking sites", "online social environments" and "online social communities" are used interchangeably.

In some implementations, the technology disclosed can create separate instances of a feed item such that each of the instances are specific to the destination social networking sites to which they are posted. In other implementations, it can use pick lists to receive user selection of entities, entity mentions, contacts, social handles, and social networking sites. In some other implementations, it can user drop down menus, dynamic lists and the like.

The technology disclosed can include systems and methods for converting entity mentions in a feed item to social networking site specific identifiers for cross posting on heterogeneous social networking sites.

In some implementations, the technology disclosed can resolve entity mentions in a feed item by looking up tag formats that are specific to each of the heterogeneous social networking sites in which the tag item is shared. In other implementations, it can automatically cross-post to the heterogeneous social networking sites associated with the entity mentions that include social handle-types, which are specific to the social networking sites.

The technology disclosed can include systems and methods for translating entity mentions in a message to social networking sites specific identifiers when posting the message to different social networking sites.

In some implementations, the technology disclosed can receive a message from a user that mentions an entity. It can further present the user with a list of handles or social networking sites for which the handles are known. Based on the user selection, it can then create separate instances of the message with specific identifiers and embed them in the corresponding social networking sites.

In some implementations, the technology disclosed can create a canonical entity identifier that is linked to multiple social handles previously specified by a user. Based on this canonical entity identifier, the technology disclosed can automatically embed different instances of a feed item in social networking sites corresponding to the multiple social handles before receiving the request to post the feed item on the multiple online social environments.

The technology disclosed relates to adapting entity mentions to online social environments for use in a computer-implemented system. The described subject matter can be implemented in the context of any computer-implemented system, such as a software-based system, a database system, a multi-tenant environment, or the like. Moreover, the described subject matter can be implemented in connection with two or more separate and distinct computer-implemented systems that cooperate and communicate with one another. One or more implementations may be implemented in numerous ways, including as a process, an apparatus, a system, a device, a method, a computer readable medium such as a computer readable storage medium containing computer readable instructions or computer program code, or as a computer program product comprising a computer usable medium having a computer readable program code embodied therein.

Translation Environment

FIG. 1 illustrates one implementation of an entity mention translation environment 100. FIG. 1 also shows that environment 100 can include contact-related data sources 120, entities store 130, social data store 145, instances data store 148 and contacts store 138. The social data store 145 can hold social accounts 140 and social handles 146. FIG. 1 also illustrates matching engine 110, translation engine 115, embedding engine 118, and crawler 128. In other implementations, environment 100 may not have the same elements as those listed above and/or may have other/different elements instead of, or in addition to, those listed above.

Regarding different types of contact-related data sources 120, access controlled application programming interfaces (APIs) like Yahoo Boss, Facebook Open Graph, Twitter Firehose can provide real-time search data aggregated from numerous social media sources such as Yahoo, Facebook and Twitter. Invocations to access controlled APIs can initialize sorting, processing and normalization of contact-related data. Public Internet can provide contact-related data from public sources such as first hand websites, blogs, web search aggregators, and social media aggregators. Social networking sites can provide contact-related data from social media sources such as Twitter, Facebook, LinkedIn, and Klout.

The entities store 138 can include real-world entities mentioned or encoded in feed items for posting on online social environments. In some implementations, these entities can have accounts registered at multiple online social environments. In other implementations, entities store 138 can hold entity mentions with supplemental entity attributes for the real-world entities. Entity attributes can represent properties or characteristics of the real-world entities such as names, addresses, job titles, usernames, contact information, employer names, etc.

In some implementations, entity mentions can be web or database profiles of the real-world entities stored as a system of interlinked hypertext documents that can be accessed via the network 125 (e.g., the Internet). Examples of entity mentions can include social profiles, social handles, unified resource locators (URLs), business-to-business contacts, etc.

The contacts store 138 can hold business-to-business contacts such as accounts, contacts and leads along with supplemental information. In some implementations, this supplemental information can be names, addresses, number of employees and other contact-related information.

The social data store 145 can include social media content like social media sources, social accounts, social personas, social profiles, social handles, etc. In some implementations, social media content can add social context to the business-to-business contacts held in the contacts store 138. Conversely, business-to-business contacts can add business context to the social personas or profiles.

Social handles from contact-related data sources 120 can be stored as social handles 146. In some implementations, social handles 146 can identify the username a person has selected and the accompanying URL like www.twitter.com/username. In other implementations, a contact's Facebook profile can be stored as social accounts 140, which can include the contact's Facebook pictures, posts, messages, etc.

The crawler 128 can spider the contact-related data sources 120 to retrieve contact-related data, including web data associated with business-to-business contacts. In some implementations, crawler 120 can extract a list of contacts from a master database and search those contacts on contact-related data sources 120 in order to determine if social or web content associated with contacts exists within those sources. If the contact-related data sources 120 provide positive matches to any of the contacts, the crawler 128 can store the retrieved social or web content in the social data store 145 and the business-to-business contacts to contacts store 138.

The matching engine 110 can match the entities mentioned in feed items to contacts stored in the contacts store 138. In some implementations, matching engine 110 can compare alphanumeric characters in the entity mentions to supplemental information of the contacts. Upon finding a match, the matching engine 110 can retrieve the supplemental information of the matched contact from the contacts store 138.

The translation engine 115 can convert entity mentions to formats that are specific to and compatible with one or more online social environments to which the entity mentions are posted via feed items. In some implementations, translation engine 115 can retrieve different social handles corresponding to one or more online social environments from the social data store 145 and create separate instances of feed items with each instance including a different 'social handle-type'. Examples of different social handle-types can include Twitter handles, Facebook usernames, LinkedIn links and the like.

The separate instances of feed items can be stored in the instances data store 148. In some implementations, separate feed items can be categorized based on the online social environment to which they are specific. In other implementations, the separate instances can be mapped to a canonical entity handle or format based according preferences of users.

The embedding engine 118 can access the instances data store 148 and insert or add the separate instances of a feed item in their respective online social environments as specified in the instances data store 148. In some implementations, embedding engine 118 can post all of the separate instances of the feed item in one or more online social environments.

Translation Workflow

FIG. 2 shows one implementation of workflow 200 of entity mention translation. Other implementations may perform the steps in different orders and/or with different, fewer or additional steps than the ones illustrated in FIG. 2. Multiple steps can be combined in some implementations. For convenience, this workflow is described with reference to the system that carries out a method. The system is not necessarily part of the method.

At step 210, the matching engine 110 can gather entity mentions in feed items from the entities store 130 and match it with contacts stored in the contacts store 138. When a contact is matched, the matching engine 110 can extract the supplemental information associated with that contact at step 220.

The matching engine 110 can then forward this supplemental information to translation engine 115 at step 230. The translation engine 115 can then use this supplemental information to invoke social data store 145 at step 240. In some implementations, the translation engine 115 can retrieve social handles 146 and social accounts 140 associated with the matched contact.

The translation engine 115 can create separate instances of entity mentions 225, 235 and 245 and thus the feeds at steps 222, 232 and 242 respectively. The separate instances can include social handle-types that are specific to various online social environments such as Twitter 206, Facebook 208, LinkedIn 258, etc. For instance, the translation engine 115 can convert the entity mentions to: Twitter-specific handlers 225 at step 222, Facebook-specific usernames 235 at step 232 and LinkedIn-specific links 245 at step 242.

In some implementations, Twitter-specific handlers 225 can be identified by "@identifier" tag formats. Similarly, Facebook-specific usernames 235 can be identified by tag formats such as "www.facebook.com/identifier" and LinkedIn-specific links 245 can include "www.linkedIn.com/identifier" tag formats.

The separate instances of entity mentions 225, 235 and 245 can be then be sent to the embedding engine 118 at steps 226, 236 and 246 respectively. In some implementations, embedding engine 118 can insert the feeds holding the separate instances of entity mentions 225, 235 and 245 in respective online social environments: Twitter 206, Facebook 208 and LinkedIn 258 at steps 228, 238 and 248 respectively. In other implementations, the embedding engine 118 can invoke the instances data store 148 to find destination online social environments corresponding to each of the separate instances of entity mentions 225, 235 and 245.

User-Interface

FIG. 3 illustrates one implementation of a graphical user-interface 300 of selecting contents for inclusion in a feed item. In particular, FIG. 3 illustrates a method for posting or updating a feed on one or more online social environments using a translation application. In some implementations, the translation application can be hosted on various online social environments such as Chatter, Facebook 208, Twitter 206, LinkedIn 258, etc. FIG. 3 also shows a pick list 305, feed tab 310, online social environment tab 320, and sharing tab 330. In other implementations, user-interface 300 may not have the same screen objects or as those listed above and/or may have other/different screen objects instead of, or in addition to, those listed above such as a social handle tabs, privacy tabs, groups tab, tag formats tabs, and the like.

The graphical user-interface 300 can provide an interface or dashboard for creating a feed item that includes entity mentions specified by users. The graphical user-interface 300 can take one of a number of forms, including a dashboard interface, engagement console, and other interface, such as a mobile interface or summary interface.

In some implementations, the translation application can be a web-based or cloud-based application running on any computing device such as a personal computer, laptop computer, mobile device or any other hand-held computing device. It can also be a non-social local application running in an on-premise environment. In other implementations, the translation application can be accessed from a browser running on a computing device. The browser can be Chrome, Internet Explorer, Firefox, Safari, etc.

In some implementations, the translation application as an engagement console can be a computer desktop application primarily used for multi-user content engagement. The engagement console can present multiple feed items into configurable "stacks" such that users can interact on individual posts. These stacks can also support various filters and execution of workflow macros allowing users to assign rules and triggers to the feed item creation. For instance, users can specify a trigger that automatically creates a feed item based on pre-assigned workflow macros such as entity mentions, online social environments and other entities with whom the feed item can be shared.

Users can type new and/or update existing messages, posts, replies, feeds, comments, etc. that include entity mentions using the feed tab 310. In some implementations, the feed tab 310 can allow users to select which contacts stored in the contacts store 138 are to be mentioned in feed items for posting in one or more online social environments. In other implementations, pick list tab 305 can be used to suggest the potential contact matches in a pick list format as a user types an entity's name or other entity-related information.

Users can specify the social handles or the online social environments for which the social handles are known using the online social environment tab 320. In some implementations, based on the social handles specified in the online social environment tab 320, the translation engine 115 can convert or translate entity mentions to corresponding social handle-types. In other implementations, the online social environment tab 320 can allow users to select which social handles stored in the social data store 145 are to be included in separate instances of a feed item. In yet other implementations pick list tab 305 can be used to suggest the matched social handles in a pick list format as a user types an entity's name or other entity-related information.

Based on the online social environments specified in the online social environment tab 320, the embedding engine 118 can insert separate instances of a feed item to corresponding online social environments. In some implementations, the online social environment tab 320 can allow users to specify the online social environments listed in the social data store 145 to which the separate instances of a feed item are to be embedded. In other implementations, pick list tab 305 can be used to suggest the online social environments in a pick list format as a user types an online social environment's name or other online social environment-related information.

Users can specify other users or groups with whom a feed item can be shared on one or more online social environments using the sharing tab 330. In some implementations, the sharing tab 330 can allow users to select the contacts stored in the contacts store 138 with whom feed items can be shared. In other implementations, pick list tab 305 can be used to suggest the potential contact matches in a pick list format as a user types a user's name or other user-related information.

In some implementations, users can use the sharing tab 330 to share feed items with other members of their online social networks hosted one or more online social environments. In other implementations, the users can also customize or filter the sharing of feed items such that a feed item can be shared with varying privacy settings and groups on different online social environments. For instance, in one online social environment, a user can share a feed item only with certain members of his social network such as family members and prevent his work colleagues from viewing it. Conversely, in another online social environment, the user can share the same feed item with his entire friend list or all of the members of his social network.

In one example, as shown in FIG. 2, as a user starts typing the feed item 308 with text "Join" and further inputs the characters "Marc B", the pick list tab 305 can suggest one or more contacts that are potential matches to the user input such as "Marc Bellfontain", "Marc Benioff", "Marc Burt", and "Marc Buttler." Similarly, in this example, the user specifies the online social environments 318, Facebook 208 and Twitter 206 in which the feed item 308 is to be posted. Finally, the sharing settings can be configured to only include friends 328.

FIG. 4 is one implementation of a graphical user-interface 400 for feed item creation. In particular, FIG. 4 shows a completed feed item 405 along with other completed post information such as destination online social environments 415 and sharing settings 425. In other implementations, user-interface 400 may not have the same screen objects or as those listed above and/or may have other/different screen objects instead of, or in addition to, those listed above such as a social handle tabs, privacy tabs, groups tab, tag formats tabs, and the like.

The completed feed item 405 can include references to two entity mentions namely "Marc Benioff" and "Dreamforce." These entity mentions can be matched to contacts stored in the contacts store 138 and can be further translated into one tag formats specific to the destination online social environments 415 namely Facebook 208 and Twitter 206. The completed feed item 405 can be posted on online social environments 415 based on the sharing settings 425, which in this example specify a user's friends or co-members on the online social environments 415.

Embedding

FIGS. 5A and 5B show various implementations of graphical user-interfaces 500A-B of embedding a feed item in multiple online social environments. In particular, FIG. 5A illustrates one implementation of embedding feed item 405 in Facebook 208 environment and FIG. 5B is one implementation of embedding feed item 405 in Twitter 206 environment. In other implementations, user-interfaces 500A-B may not have the same screen objects or as those listed above and/or may have other/different screen objects instead of, or in addition to, those listed above. For instance, user-interfaces 500A-B can illustrate feed item embedding in other online social environments like LinkedIn.

Embedding engine 118 can insert a Facebook-specific instance 502 of feed item 405 in Facebook feed. In some implementations, this Facebook-specific instance 502 can include tag formats or user names "Marc Benioff" 505 and "Dreamforce" 510 that are compatible with Facebook social handle-types. In other implementations, embedding engine 118 can add the Facebook-specific instance 502 to social accounts of the entities corresponding to user names "Marc Benioff" 505 and "Dreamforce" 510. In yet other implementations, a preview 515 of the social accounts of the entities can be displayed.

Embedding engine 118 can insert a Twitter-specific instance 528 of feed item 405 in Twitter feed. In some implementations, this Twitter-specific instance 528 can include identifiers or handles "@Benioff" 520 and "@Dreamforce" 525 that are compatible with Twitter social handle-types. In other implementations, embedding engine 118 can add the Twitter-specific instance 528 to social accounts of the entities corresponding to social handles "@Benioff" 520 and "@Dreamforce" 525. In some other implementations, a reply tab 530 can be used to respond or forward the Twitter-specific instance 528.

Translation Schema

FIG. 6 illustrates one implementation of an entity mention translation schema 600. FIG. 6 shows that schema 600 can include an entities table 602. In some implementations, entities table 602 can be associated with a contacts table 604 through one-to-one mapping and to feeds table 610 via one-to-many mapping. The contacts table 604 can be further associated with one or more online social environment tables such as Twitter table 606, Facebook table 608 and LinkedIn table 614 using one-to-one mapping. In other implementations, schema 600 may not have the same tables or fields as those listed above and/or may have other/different tables or fields instead of, or in addition to, those listed above. In some implementations, contacts table 604 can be associated with tables for other online social environments like Chatter, Klout, etc. In other implementations, the contacts table 604 can be mapped to a supplemental information table that can include fields such as pseudonyms, addresses, phone numbers, employer names, etc.

When a user specifies or mentions an entity in a feed item, that entity can be stored in the entities table 602. For example, the entities table 602 can include entity mentions 603 such as "Benioff", "Bryan" and "Dreamforce." The matching engine 110 can then compare these entity mentions 603 to contacts 605 stored in the contacts table 604. In some implementations, entity mentions 603 and contacts 605 can be matched based on first names, last names, alphanumeric characters, and/or grammar rules. For instance, the contacts table 604 can hold contacts 605 with fields matching the fields of entity mentions 603 including "Marc Benioff", "Bryan Hart" and "Dreamforce" respectively.

In some implementations, contacts table 604 can be further associated to one or more online social environment tables including Twitter table 606, Facebook table 608 and LinkedIn table 614. These associations can be made via one-to-one relationships such that for each contact stored in the contacts table 604, the online social environment tables can represent various accounts registered by the contacts on different online social environments like Twitter 206, Facebook 208, LinkedIn 258, etc.

The fields of the online social environment tables 606, 608 and 614 can include social handles of the contacts 605 that are specific to that online social environment. For instance, Twitter table 606 can include Twitter handles 607 of the contacts 605, including "@benioff", "@bhart" and "@Dreamforce."

Similarly, Facebook table 608 can include Facebook usernames 609 of the contacts 605 such as "/mbenioff", "/bhart" and "/Dreamforce." Finally, LinkedIn table 614 can include LinkedIn links 615 of the contacts 605 like "/marc-benioff", "/bryan-hart" and "/Dreamforce-2013."

In some implementations, the entities table 602 can be mapped to feeds table 610 via one-to-many mapping such that feeds table 610 can include feed items mentioning entities specified in entities table 602. The feeds table 610 can include a feed item 611 that includes contacts "Marc Benioff" and "Dreamforce" corresponding to entity mentions 603 "Benioff" and "Dreamforce" respectively. These fields can be populated when a user creates a feed item 405 using feed tab 310 to include a corresponding feed 611 with characters "Join Marc Benioff at Dreamforce this year!" In some other implementations, background text such as "Join" can be distinguished from contact name like "Marc Benioff" using tags or other identifiers such as "@." In this implementation, when a user places a tag or identifier in the feed tab 310, the technology disclosed can invoke the contact database and suggest contact names corresponding to characters following the tag or identifier. In other implementations, natural language processes can be used to differentiate background text from a contact name.

The feeds table 610 can be connected to an instances table 612 through one-to-many relationship since a single feed item can have many instances or translations. The translation engine 115 can convert the feed item 611 into one or more separate instances 613 that are compatible with tag formats or identifiers of Twitter 206, Facebook 208 and LinkedIn 258. In some implementations, these instances 613 can be stored in an instances table 612 and include a Facebook-specific instance with characters "Join /mbenioff at /Dreamforce this year!" with Facebook usernames, a Twitter-specific instance with characters "Join @benioff at @Dreamforce this year!" with Twitter handles and a LinkedIn-specific instance with characters "Join /marc-benioff at /Dreamforce-2013 this year!" with LinkedIn links.

Flowcharts

FIG. 7 is a flow chart 700 of one implementation of adapting entity mentions to online social environments based specificities. Other implementations may perform the steps in different orders and/or with different, fewer or additional steps than the ones illustrated in FIG. 7. Multiple steps can be combined in some implementations. For convenience, this flowchart is described with reference to the system that carries out a method. The system is not necessarily part of the method.

Responsive to feed item's posting on multiple online social environments, the technology disclosed, at step 702, can include receiving a request to post a feed on multiple online social environments such as Facebook, Twitter, LinkedIn, etc. In some implementations, the request can include identifiers that identify entities. In other implementations, the feed item can mention the entities.

At step 704, the technology disclosed can receive a selection of multiple online social environments for posting the feed item. In some implementations, this selection can be made by a user across a user-interface and further can be stored in a database. In other implementations, it can receive a selection of social handle-types, contacts, supplemental information about the contacts, entity mentions, entity names and other contact-related information and/or entity related information.

The technology disclosed can match the identifier to a particular contact stored in a database at step 706. In some implementations, this identifier can be a social handle-type, contact, supplemental information about the contact, entity mention, entity name and other contact-related information and/or entity related information. In other implementations, the contact can hold supplemental information that includes multiple social handles of the entity for the multiple online social environments.

The technology disclosed can retrieve the multiple social handles associated with the entity at step 708. Examples of multiple social handles can include Facebook usernames, Twitter handles, LinkedIn links, Klout scores, and the like. In some implementations, the technology disclosed can use a translation engine 115 to retrieve the multiple social handles from social handles store 146.

At step 710, the technology disclosed can creating different instances of the feed item. In some implementations, it can replace the entity mentions in the feed item with social handle-types of corresponding online social environments on which the feed item is to be posted. In other implementations, it can post all of the different instances in the same online social environment.

The technology disclosed can embed the different instances of the feed in the online social environments at step 712. In some implementations, it can use the embedding engine 118 to retrieve the different instances of the feed item from the instances data store 148 and post it on separate online social environments Twitter 206, Facebook 208 and LinkedIn 258 such that each of the instance includes one or more tag formats compatible with that of the destination online social environment.

FIG. 8 shows a flow chart 800 of one implementation of converting entity mentions to online social environments specific identifiers. Other implementations may perform the steps in different orders and/or with different, fewer or additional steps than the ones illustrated in FIG. 8. Multiple steps can be combined in some implementations. For convenience, this flowchart is described with reference to the system that carries out a method. The system is not necessarily part of the method.

At step 802, the technology disclosed can receive a feed item that includes an entity mention. In some implementations, the entity mention can refer to entities that have accounts registered at the heterogeneous online social environments such as Twitter 206, Facebook 208 and LinkedIn 258.

The technology disclosed can resolve the entity mentions using a lookup to find tag formats specific to heterogeneous online social environments at step 804. In some implementations, the tag formats can be links to accounts or profiles representing the entities at the heterogeneous online social environments.

The technology disclosed can look up a database at step 806 that is automatically populated by the web crawler 128 to retrieve social handle-types, contacts, supplemental information about the contacts, entity mentions, entity names and other contact-related information and/or entity related information. In some implementations, this database can be stored in a portable device's memory such as that of a cellphone and populated manually by a user. In other implementations, this database can be stored in a Read Only Memory (ROM), a Random Access Memory (RAM), and/or a flash ROM. In yet other implementations, this database can be stored in memory units that include: micro-codes of a program for processing and controlling device operations, temporary data generated during program executions, reserved data, and data transmitted and received by a mobile device.

At step 808, the technology disclosed can use pick lists to receive user selection. In some implementations, it can use pick lists to present at least the entity mentions for encoding in the feed item and the tag formats or the heterogeneous online social environments for which the tag formats are known.

At step 810, the technology disclosed can encode the tag formats in different instances of the feed item. In some implementations, it can replace the entity mention in the feed item with tag format-types of corresponding heterogeneous online social environments on which the feed item is to be posted. In other implementations, it can post all of the different instances in the same online social environment.

At step 812, the technology disclosed can automatically cross-post to the heterogeneous online social environments associated with the entity mentions using the tag formats compatible with each of the heterogeneous online social environments. For instance, when a post is made to Twitter 206 from Facebook 208 using Facebook identifiers "/username", the technology disclosed can translate that post to include corresponding Twitter handles "@handle" instead of the Facebook identifiers.

FIG. 9 illustrates a flow chart 900 of one implementation of translating entity mentions to social networking sites specific identifiers. Other implementations may perform the steps in different orders and/or with different, fewer or additional steps than the ones illustrated in FIG. 9. Multiple steps can be combined in some implementations. For convenience, this flowchart is described with reference to the system that carries out a method. The system is not necessarily part of the method.

At step 902, the technology disclosed can include a user sending a message that is to be embedded in different social networking sites. In some implementations, the message can mention an entity. It can also include a database that stores entity profiles with multiple handles representing the entity at the different social networking sites.

The technology disclosed can provide a user a list of handles or social networking sites for which the handles are known at step 904. In some implementations, the list of handles or social networking sites can be retrieved from social handles store 146.

At step 906, the technology disclosed can include a user selecting from the list and specifying separate instances of the message to be embedded with the handles in the different social networking sites. The technology disclosed can specify a canonical entity handle linked to multiple handles, tag formats or identifiers at step 908 before sending the message to be embedded in the different social networking sites. In some implementations, the user can previously specify the canonical entity handle and the linked multiple handles can be stored in a database and retrieved when a user creates a feed item that includes the canonical entity handle. At step 910, the technology disclosed can embed the different instances of the feed item in the online social environments. In some implementations, it can use the embedding engine 118 to retrieve the different instances of the feed item from the instances data store 148 and post it on separate social networking sites Twitter 206, Facebook 208 and LinkedIn 258 such that each of the instance includes social handles compatible with that of the destination social networking sites.

Computer System

FIG. 10 is a block diagram of an example computer system 1000 of entity identification. FIG. 10 is a block diagram of an example computer system, according to one implementation. Computer system 1010 typically includes at least one processor 1014 that communicates with a number of peripheral devices via bus subsystem 1012. These peripheral devices may include a storage subsystem 1024 including, for example, memory devices and a file storage subsystem, user interface input devices 1022, user interface output devices 1020, and a network interface subsystem 1016. The input and output devices allow user interaction with computer system 1010. Network interface subsystem 1016 provides an interface to outside networks, including an interface to corresponding interface devices in other computer systems.

User interface input devices 1022 may include a keyboard; pointing devices such as a mouse, trackball, touchpad, or graphics tablet; a scanner; a touch screen incorporated into the display; audio input devices such as voice recognition systems and microphones; and other types of input devices. In general, use of the term "input device" is intended to include all possible types of devices and ways to input information into computer system 1010.

User interface output devices 1020 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide a non-visual display such as audio output devices. In general, use of the term "output device" is intended to include all possible types of devices and ways to output information from computer system 1010 to the user or to another machine or computer system.

Storage subsystem 1024 stores programming and data constructs that provide the functionality of some or all of the modules and methods described herein. These software modules are generally executed by processor 1014 alone or in combination with other processors.

Memory 1026 used in the storage subsystem can include a number of memories including a main random access memory (RAM) 1030 for storage of instructions and data during program execution and a read only memory (ROM) 1032 in which fixed instructions are stored. A file storage subsystem 1028 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 1028 in the storage subsystem 1024, or in other machines accessible by the processor.

Bus subsystem 1012 provides a mechanism for letting the various components and subsystems of computer system 1010 communicate with each other as intended. Although bus subsystem 1012 is shown schematically as a single bus, alternative implementations of the bus subsystem may use multiple busses.

Computer system 1010 can be of varying types including a workstation, server, computing cluster, blade server, server farm, or any other data processing system or computing device. Due to the ever-changing nature of computers and networks, the description of computer system 1010 depicted in FIG. 10 is intended only as one example. Many other configurations of computer system 1010 are possible having more or fewer components than the computer system depicted in FIG. 10.

Particular Implementations

In one implementation, a method is described from the perspective of a system receiving messages from a user software. In this implementation, the method includes adapting entity mentions in a feed item to online social environments based specificities responsive to feed item's posting on multiple online social environments. The method includes receiving a request to post a feed item on multiple online social environments. The request includes at least one identifier that identifies an entity and the feed mentions the entity. It further includes receiving a selection of the multiple online social environments for posting the feed item. It also includes matching the identifier to a particular contact stored in a database. The contact holds supplemental information that includes multiple social handles of the entity for the multiple online social environments.

The technology disclosed also includes retrieving the multiple social handles associated with the entity. It further includes creating different instances of the feed item. The different instances include social handles that are specific to the multiple online environments. It also includes embedding the different instances of the feed item in the online social environments.

This method and other implementations of the technology disclosed can each optionally include one or more of the following features and/or features described in connection with additional methods disclosed. In the interest of conciseness, the combinations of features disclosed in this application are not individually enumerated and are not repeated with each base set of features. The reader will understand how features identified in this section can readily be combined with sets of base features identified as implementations such as translation environment, translation workflow, embedding, etc.

The method further includes social accounts of the entity being registered at the multiple online social environments. It includes automatically populating the database by a web crawler. It also includes the social handles being links to the social accounts that represent the entity at the multiple online social environments.

The method further includes creating a canonical entity identifier linked to multiple social handles previously specified by a user and using the canonical entity identifier in the retrieving of the multiple social handles. It also includes the selection of the multiple online social environments being performed as a configuration before receiving the request to post the feed item on the multiple online social environments. It further includes using pick lists to receive user selection by presenting at least the particular contact stored in the database and the multiple social handles or the multiple online social environments for which the handles are known.

Other implementations may include a non-transitory computer readable storage medium storing instructions executable by a processor to perform any of the methods described above. Yet another implementation may include a system including memory and one or more processors operable to execute instructions, stored in the memory, to perform any of the methods described above.

In another implementation, a method is described from the perspective of a system receiving messages from a user software. In this implementation, the method can include converting entity mentions in a feed item to online social environments specific identifiers for cross posting on heterogeneous online social environments. The method includes receiving a feed item that includes an entity mention. It further includes resolving the entity mentions using a lookup to find tag formats specific to heterogeneous online social environments. It also includes encoding the tag formats in different instances of the feed item and automatically cross posting to the heterogeneous online social environments associated with the entity mentions using the tag formats compatible with each of the heterogeneous online social environments.

This method and other implementations of the technology disclosed can each optionally include one or more of the following features and/or features described in connection with additional methods disclosed.

The method further includes entity mentions referring to entities that have social accounts registered at the heterogeneous online social environments. It includes looking up a database that is automatically populated by a web crawler. It also includes the tag formats being links to the social accounts that represent the entities at the heterogeneous online social environments.

The method further includes creating a canonical entity tag linked to tag formats previously specified by a user and using the canonical entity tag in the finding of tag formats specific to the heterogeneous online social environments. It also includes using pick lists to receive user selection by presenting at least the entity mentions for encoding in the feed item and the tag formats or the heterogeneous online social environments for which the tag formats are known.

Other implementations may include a non-transitory computer readable storage medium storing instructions executable by a processor to perform any of the methods described above. Yet another implementation may include a system including memory and one or more processors operable to execute instructions, stored in the memory, to perform any of the methods described above.

In yet another implementation, a method is described from the perspective of a user software in communication with a server. In this implementation, the method includes translating entity mentions in a message to social networking sites specific identifiers when posting the message to different social networking sites. The method includes sending a message to be embedded in different social networking sites. The message mentions an entity and a database is accessible that stores entity profiles with multiple handles representing the entity at the different social networking sites. It further includes receiving a list of handles or social networking sites for which the handles are known. It also includes selecting from the list and specifying separate instances of the message to be embedded with the handles in the different social networking sites.

This method and other implementations of the technology disclosed can each optionally include one or more of the following features and/or features described in connection with additional methods disclosed.

The method further includes the entity having social accounts registered at the different social networking sites. It includes the database being automatically populated by a web crawler. It also includes the handles being links to the social accounts that represent the entity at the different social networking sites.

The method further includes specifying a canonical entity handle linked to multiple handles before sending the message to be embedded in the different social networking sites. It includes the separate instances of the message being automatically embedded in the social networking sites corresponding to the multiple handles as a configuration before receiving the list of the handles or the social networking sites for which the handles are known. It also includes selecting through pick lists at least the entity for mention in the message and the handles or the social networking sites for which the handles are known.

Other implementations may include a non-transitory computer readable storage medium storing instructions executable by a processor to perform any of the methods described above. Yet another implementation may include a system including memory and one or more processors operable to execute instructions, stored in the memory, to perform any of the methods described above.

While the present invention is disclosed by reference to the preferred implementations and examples detailed above, it is to be understood that these examples are intended in an illustrative rather than in a limiting sense. It is contemplated that modifications and combinations will readily occur to those skilled in the art, which modifications and combinations will be within the spirit of the invention and the scope of the following claims.

The invention claimed is:

1. A method for adapting entity mentions in a feed item to requirements for posting on multiple online social environments, the method including:
   receiving a request to post a feed item on multiple online social environments, wherein the request mentions at least one identifier that identifies an entity;
   receiving a selection of the multiple online social environments for posting the feed item;
   matching the identifier to a particular contact stored in a database, wherein the contact holds supplemental information that includes multiple social handles of the entity for at least some of the multiple online social environments;
   retrieving the multiple social handles associated with the entity;
   creating different instances of the feed item, wherein the different instances include social handles that are specific to the multiple online environments; and
   embedding the different instances of the feed item in the online social environments.

2. The method of claim 1, wherein social accounts of the entity are registered at the multiple online social environments.

3. The method of claim 1, wherein the database is automatically populated by a web crawler.

4. The method of claim 1, wherein the social handles are links to social accounts that represent the entity at the multiple online social environments.

5. The method of claim 1, further including creating a canonical entity identifier linked to multiple social handles previously specified by a user and using the canonical entity identifier in the retrieving of the multiple social handles.

6. The method of claim 1, wherein the selection of the multiple online social environments is performed as a configuration before receiving the request to post the feed item on the multiple online social environments.

7. The method of claim 1, further including providing pick lists to receive user selection by presenting at least:
   the particular contact stored in the database; and
   the multiple social handles or the multiple online social environments for which the handles are known.

8. A method for converting entity mentions in a feed item to online social environments specific identifiers for cross posting on heterogeneous online social environments, the method including:
   receiving a feed item that includes an entity mention;
   resolving the entity mention using a lookup to find tag formats specific to heterogeneous online social environments;
   encoding the tag formats in different instances of the feed item; and
   automatically cross posting to the heterogeneous online social environments associated with the entity mention using the tag formats compatible with the heterogeneous online social environments.

9. The method of claim 8, wherein the entity mentions refer to entities that have social accounts registered at the heterogeneous online social environments.

10. The method of claim 8, further including looking up a database that is automatically populated by a web crawler.

11. The method of claim 8, wherein the tag formats are links to social accounts that represent the entities at the heterogeneous online social environments.

12. The method of claim 8, further including creating a canonical entity tag linked to tag formats previously specified by a user and using the canonical entity tag in the finding of tag formats specific to the heterogeneous online social environments.

13. The method of claim 8, further including using pick lists to receive user selection by presenting at least:
   the entity mentions for encoding in the feed item; and
   the tag formats or the heterogeneous online social environments for which the tag formats are known.

14. A method for translating entity mentions in a message to social networking sites specific identifiers when posting the message to different social networking sites, the method including:
   sending a message to be embedded in different social networking sites, wherein the message mentions an entity and a database is accessible that stores entity profiles with multiple handles representing the entity at the different social networking sites;
   receiving a list of handles or social networking sites for which the handles are known; and
   selecting from the list and specifying separate instances of the message to be embedded with the handles in the different social networking sites.

15. The method of claim 14, wherein the entity has social accounts registered at the different social networking sites.

16. The method of claim 14, wherein the database is automatically populated by a web crawler.

17. The method of claim 14, wherein the handles are links to social accounts that represent the entity at the different social networking sites.

18. The method of claim 14, further including specifying a canonical entity handle linked to multiple handles before sending the message to be embedded in the different social networking sites.

19. The method of claim 14, wherein the separate instances of the message are automatically embedded in the social networking sites corresponding to the multiple handles as a configuration before receiving the list of the handles or the social networking sites for which the handles are known.

20. The method of claim 14, further including selecting through pick lists at least:
   the entity for mention in the message; and
   the handles or the social networking sites for which the handles are known.

* * * * *